United States Patent [19]
Edelman et al.
[11] 3,894,243
[45] July 8, 1975

[54] POLYMERIC TRANSDUCER ARRAY

[75] Inventors: Seymour Edelman, Silver Spring, Md.; Steven C. Roth, Fairfax, Va.; Carol F. Vezzetti, Silver Spring, Md.

[73] Assignee: The United States of America as represented by the Secretary of the Navy, Washington, D.C.

[22] Filed: June 6, 1974

[21] Appl. No.: 477,142

[52] U.S. Cl. .......................... 307/88 ET; 179/111 E
[51] Int. Cl.[2] .......................... H04R 19/00
[58] Field of Search ............ 307/88 ET; 179/111 E; 29/25.35

[56] References Cited

UNITED STATES PATENTS

| | | | |
|---|---|---|---|
| 3,736,436 | 5/1973 | Crites | 307/88 ET |
| 3,772,133 | 11/1973 | Schmitt | 307/88 ET |
| 3,794,986 | 2/1974 | Murayama | 307/88 ET |
| 3,821,491 | 6/1974 | Whetstone et al. | 307/88 ET |
| 3,821,492 | 6/1974 | Tamura et al. | 179/111 E |

*Primary Examiner*—Stanley M. Urynowicz, Jr.
*Attorney, Agent, or Firm*—R. S. Sciascia; P. Schneider

[57] ABSTRACT

An array of polymeric film transducers and method for making the array. The array consists of two sandwiches. The first comprises an array of identical areas of conductive film laid down on a sheet of permanently polarizable polymeric film. A second conductive film is laid down on the back of the polymeric sheet and the polymeric film is permanently polarized under each of the first set of conductive areas, thus forming an array of active transducing areas. Leads of conductive film are then laid down, one to each of the identical conductive areas. External leads are connected to each of the transducing area leads.

A second sandwich is made which is identical to the first except that it is a mirror-image of the first and has no external leads. The two sandwiches are adhered together with the identical conductive areas and leads facing each other and in correspondence with each other.

10 Claims, 2 Drawing Figures

POLYMERIC TRANSDUCER ARRAY

BACKGROUND OF THE INVENTION

This invention relates to an array of transducers and especially to an array of polymeric film transducers.

Transducers for sensing pressure waves are generally of the piezoelectric ceramic type. The size of these transducers and the fact that they must be supported in some way is sometimes a handicap when they are to be used in an array. It would be desirable to have an array of transducers that can be made in any shape or size that is useful for a particular application and which is very inexpensive to manufacture. In addition, it would be very desirable in many applications to have a transducer array which can be affixed to a surface and which will take the shape of the surface.

SUMMARY OF THE INVENTION

The invention comprises an array of dynamic pressure and vibration transducers formed by laying down metallic films on both sides of a sheet of permanently polarizable polymeric material. One side is covered completely and the other side is dotted with metallic areas according to the desired array configuration. The areas covered by the latter metallic areas are the active transducing areas. Leads are then laid down to the metallic areas.

Two such sheets are adhered together with the metallic areas and leads in correspondence to form a composite sandwich in the form of a pliable sheet.

OBJECTS OF THE INVENTION

An object of the invention is to provide a transducer array that can be made in any desirable shape or size.

Another object is to provide a transducer array which is simple, easy to manufacture and inexpensive.

A further object is to provide a transducer array which is in the shape of a film that can be easily affixed to a surface and will take the shape of the surface.

Other objects, advantages, and novel features of the present invention will become apparent from the following detailed description of the invention when considered in conjunction with the accompanying drawings.

DETAILED DESCRIPTION OF THE INVENTION

A transducing array according to the present invention may be made in different shapes and sizes. The individual transducers 12 in the array may also be made in various shapes and sizes. One shape, which will be taken as an example herein, is round and perhaps one-half inch in diameter.

Figure 1:
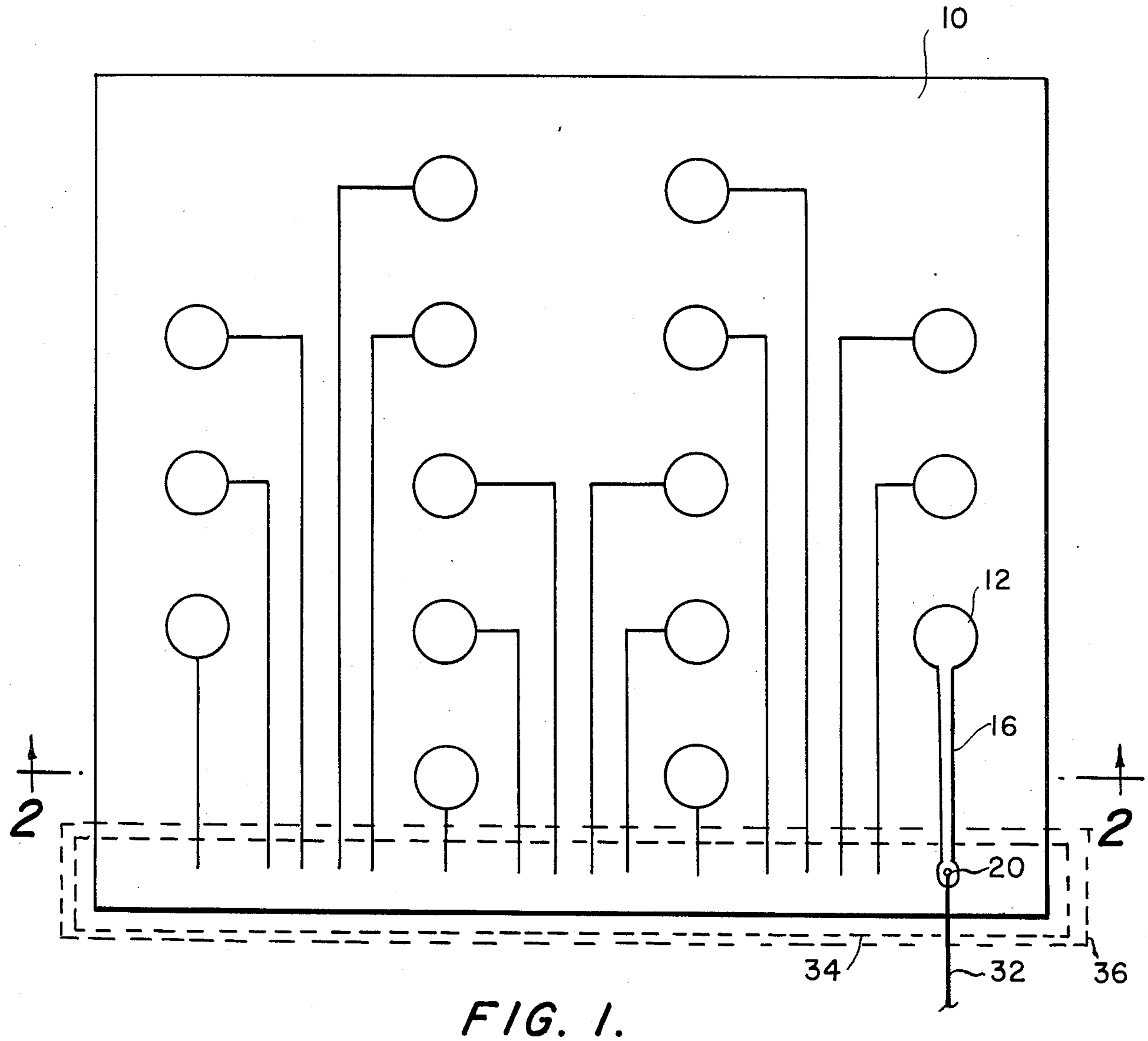
FIG. 1 is a plan view of one of the sandwiches comprising an embodiment of the invention.

In FIG. 1, a sheet of polymeric material 10 such as polyvinyl fluoride or chloride, or polyvinylidene fluoride or chloride, or cellulose acetate butrate, for example, is treated by evaporating a conductive film through a mask to allow geometrically shaped areas, such as circles 12, to form on one of its surfaces. The conductive film may be a metal such as aluminum, for example. The open areas of the mask are formed to provide the desired array shape of conductive film areas.

The other side of the polymeric sheet 10 is then coated with a thin conductive film of a material such as nickel, for example, the thickness of this film allowing it to be transparent. The two coatings and the polymeric sheet in between form a sandwich.

The polymeric sheet is chosen from a polymer which has a molecular structure which comprises dipoles which can be poled, or polarized, to have a permanent net orientation so that the two surfaces of the sheet are oppositely charged.

The polymer in the areas under the circles (which, after poling will become the active transducing areas) is now poled by applying a D.C. voltage across each of the metal circles 12 and the metallic film 14 on the opposite surface. The field across the polymer should be between 300,000 to 1 million volts/cm, preferably about 500,000 volts/cm. The polymer is heated to between 80° and 130°C, preferably about 100°C, and then allowed to cool, the field being applied during heating and cooling. This permanently aligns many of the dipoles of the polymer in the same direction so that there is a net dipole orientation in that direction. The poling is done, preferably under pressure in a press, for example, to keep the polymer from wrinkling as it is heated and cooled.

Another mask is now placed over the sheet 10 and leads 16 of a conductive material, such as aluminum, are laid down by evaporation. A dot of conductive adhesive, such as silver epoxy, is put down near the end of each conductive lead. External leads are now placed in contact with the dots, which are allowed to harden. The external leads may be wires which are flattened at the ends to fit over the flat internal leads 16.

Figure 2:
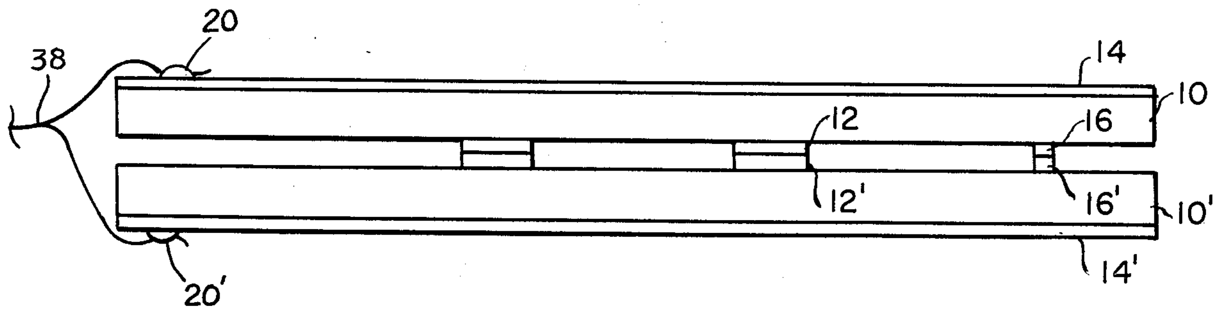
FIG. 2 is a cross-sectional view through FIG. 1 taken along the line 2—2.

A second sheet of polymer is now prepared, which is a mirror image of the first with respect to the side containing the circles and leads, except that it has no silver-epoxy dots nor external leads. (It is apparent, of course, that if the circle and lead configuration is symmetric about a vertical line passing through the center of the array, the same mask can be used for both sandwiches since the mirror-image mask will be the same as the first mask.) The surfaces which have the metallic circles are coated with a very thin layer of contact cement and, after the layers dry, the coated surfaces are pressed together so that the circles 12 and leads 16 on one sheet are in correspondence with their corresponding circles and leads on the other (see FIG. 2). No openings are left in the area between the sheets. FIG. 2 shows the two sandwiches just before they are pressed together.

The area at the bottom of the composite sandwich and a small length of the incoming external leads are now covered with epoxy which hardens to strengthen the lead-in area so that it can be handled without breaking or pulling out the external leads.

A wire, or other conductive lead, can then be cemented into contact with the film on the outer surfaces of the composite sandwich to form a ground connection. The ground connection may be formed in any other convenient way — for example, rubber may be applied to the external leads to insulate them and a sheet of conductive, pliable material, such as silver-filled epoxy or rubber, can be placed over the sheet of protective epoxy to make contact with the outer metallic films and with the ground shield of a cable coming to a multiple connector to whose terminals the external leads are also connected.

The thickness of the polymeric films may vary from about ½–5 mils, although as much as 10 mils has been used. The difficulty with thinner films is that they tend to wrinkle under the poling treatment.

The thickness of the aluminum transducer and lead areas may be about 2,000 Angstroms. That of the nickel films may be about 300 Angstroms because it is desirable to be able to see through this layer for alignment purposes when the two transducer sandwiches are cemented together. Other metals can also be employed to form the electrodes. It is obvious, of course, that the active area of the transducer can have any desired geometrical shape-circle, triangle, square, rectangle, polygon-and can be made as small or as large as desired.

Arrays made by this method can be used in many different applications for sensing vibrations and dynamic pressures, especially on thin or compliant surfaces. The arrays have very little mass and can be conformably attached to various surfaces by a little cement or glue. Typical applications are for crash studies in automobiles and airplanes; fatigue studies in helicopters, ships, planes and space vehicles; and noise studies in heating and airconditioning equipment and pumps.

Obviously, many modifications and variations of the present invention are possible in light of the above teachings. It is therefore to be understood that, within the scope of the appended claims, the invention may be practiced otherwise than as specifically described.

What is claimed is:

1. An array of polymeric film transducers for sensing dynamic pressure and vibrations comprising:

a first film sandwich comprising a sheet of permanently polarizable polymeric film coated with a plurality of geometrically shaped areas of electrically conductive material on one surface, said areas being laid down in a desired array configuration, said polymeric film being coated on the other surface with a conductive material which covers at least the same area covered on the first side by the geometrically shaped areas, the area of polymeric film under each geometrically shaped area being permanently poled, said first surface of said polymeric film further having leads of conductive material laid down thereon, a different lead being connected to and extending from each said geometrically shaped area;

a second film sandwich which is a mirror image of the first, said second sandwich being placed in geometrical correspondence with the first with respect to the geometrically shaped areas and their leads which form the interface, the two sandwiches being adhered to each other to form a composite sandwich;

electrical connection means making electrical contact with the leads in the interface area; and electrical connection means making electrical contact with both of said outer conductive coatings.

2. An array as in claim 1, wherein each said lead carries a dot of conductive adhesive thereon, the electrical connection means for each lead making contact with its associated dot.

3. An array as in claim 1, wherein the conductive coatings are metallic.

4. An array as in claim 1, wherein the geometrically shaped coatings and their leads are formed from aluminum and the outer coatings from nickel, the nickel coatings being thin enough to be transparent.

5. An array as in claim 1, wherein a thick coating of pliable adhesive is placed over the composite sandwich to cover the area of connection of the electrical connection means to the leads, said adhesive also covering a part of the incoming connection means.

6. An array as in claim 1, wherein said electrical connection means making contact with said outer conductive coatings is an electrically conductive adhesive material.

7. An array as in claim 7, wherein said conductive coating is silver-filled epoxy.

8. An array as in claim 5, wherein said coating of adhesive is formed from epoxy resin.

9. A method for making a polymeric film transducer array for sensing dynamic pressure and vibrations comprising the steps of:

coating one surface of a sheet of permanently polarizable polymeric film with an electrically conductive film in the shape of geometrically shaped spaced areas which form a desired array configuration and with a different lead to each such area;

coating the other side of the polymeric sheet with an electrically conductive film to cover at least the area covered by said geometrically shaped areas;

permanently polarizing the areas of polymeric film underlying said geometrically shaped areas to form active transducing areas;

forming another such transducing sandwich of conductive film-polymeric film-conductive film which is a mirror image of the first;

connecting a different external electrical lead to each internal lead of the first sandwich;

adhering both sandwiches together with the surfaces containing the geometrically shaped areas forming the interface, the geometrically shaped areas and leads of one surface being in geometrical correspondence with those of the other surface to form a composite sandwich; and connecting an electrical lead to both coatings on the outer surfaces of said composite sandwich.

10. A method as in claim 9, wherein said conductive coatings are metallic.

* * * * *